MAGNETIC TAPE APPARATUS

Filed Jan. 28, 1957 3 Sheets-Sheet 1

INVENTORS
Konrad W. Schoebel
Walter T. Selsted
BY
[signature]
ATTORNEYS

INVENTORS
Konrad W. Schoebel
BY Walter T. Selsted

Flehr and Swain
ATTORNEYS

Aug. 9, 1960 K. W. SCHOEBEL ET AL 2,948,488

MAGNETIC TAPE APPARATUS

Filed Jan. 28, 1957 3 Sheets-Sheet 3

INVENTORS
Konrad W. Schoebel
BY Walter T. Selsted

ATTORNEYS 2,948,488

MAGNETIC TAPE APPARATUS

Konrad W. Schoebel and Walter T. Selsted, Redwood City, Calif., assignors to Ampex Corporation, Redwood City, Calif., a corporation of California Filed Jan. 28, 1957, Ser. No. 636,596

6 Claims. (Cl. 242—75.43)

This invention relates generally to magnetic tape machines for recording and/or playback of recordable signal frequencies.

Conventional magnetic tape machines employ turntables adapted to mount supply and take-up reels, together with capstan means which draws the tape across a magnetic head assembly. The capstan means generally consists of a motor driven capstan against which the tape is pressed by a spring or solenoid urged roller. It is known that such conventional machines are subject to fluttering effects which are particularly undesirable when the machine is used for certain purposes, such as precision data recording, where freedom from distortion is important.

In general it is an object of the present invention to provide a magnetic tape machine having improved tape driving means which serves to reduce flutter to a minimum.

Another object of the invention is to provide a machine of the above character having improved means for maintaining the tape leaving the supply reel under constant tension.

Another object of the invention is to provide an improved capstan assembly and tape transport means serving to maintain a tight tape loop for that part of the tape which engages the magnetic head assembly or assemblies.

Additional objects and features of the invention will appear from the following description in which the preferred embodiment has been set forth in detail in conjunction with the accompanying drawing.

Referring to the drawing.

Figure 1:
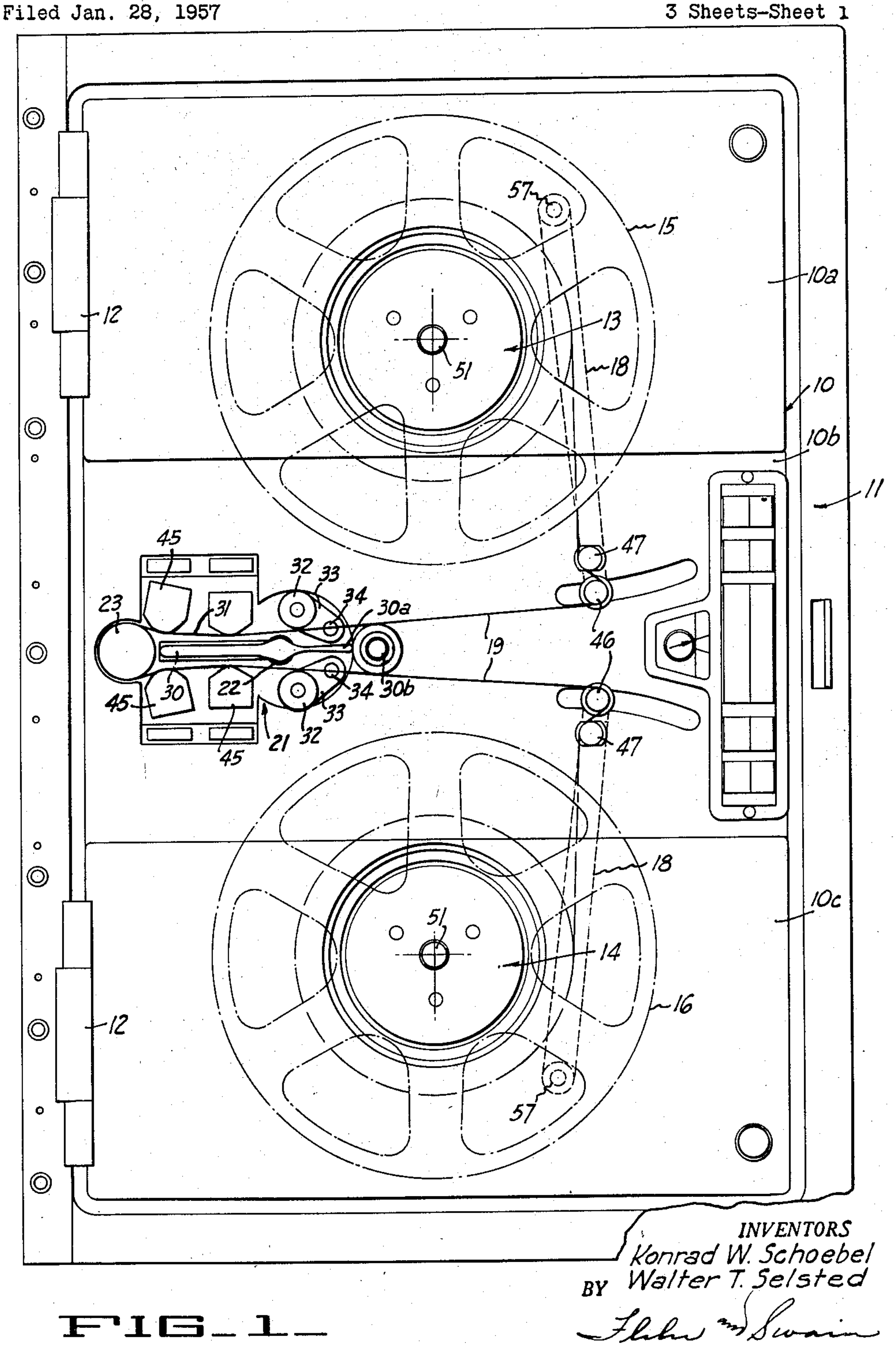
Figure 1 is a side elevational view illustrating a magnetic tape machine incorporating the present invention.

The machine illustrated comprises a support means including a top plate 10 preferably formed in sections 10*a*, 10*b*, and 10*c*. These plate sections may form the top or side of the housing 11 and sections 10*a* and 10*c* are shown carried by hinges 12 to facilitate servicing. The turntables 13 and 14, associated with the plate sections 10*a* and 10*c*, serve to mount the tape take-up and supply reels 15 and 16, respectively. Each turntable is provided with a motor 17, and is carried by an inner mounting plate 20. Also each turntable is provided with brake means illustrated particularly in Figures 2 and 3, that is controlled in part by movements of a tension arm 18.

Figure 4:
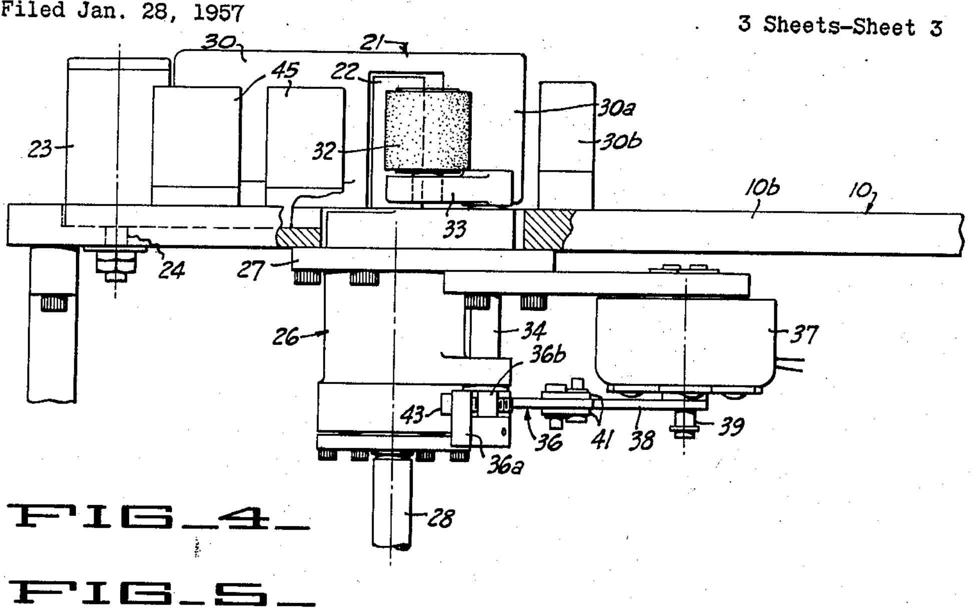
Figure 4 is a bottom view of the center section of the machine shown in Figure 1, with parts being cut away to better illustrate the capstan assembly.
Figure 5:
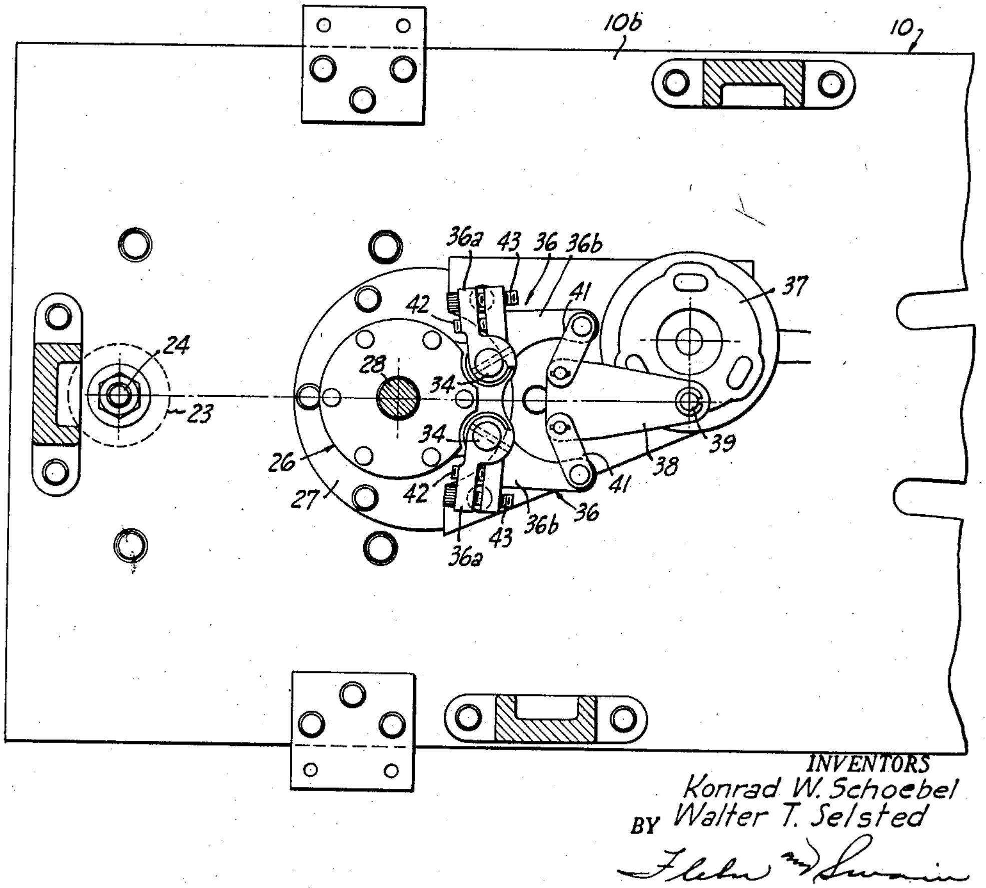
Figure 5 is another view of the capstan assembly, looking toward the lower side of the assembly as it appears in Figure 4.

The capstan assembly designated generally at 21 operates on that part of the magnetic tape 19 that extends between the reels, and as previously mentioned serves to maintain a tight loop. As illustrated this assembly consists of (Figs. 1, 4, and 5) a tape driving capstan 22, together with an idler roller 23. The idler roller is journaled to a shaft 24 which in turn is rigidly mounted on the plate section 10*b* (Figure 4). The capstan 22 is rotatably carried by the mounting 26 which may have a flange 27 for attachment to the plate section 10*b*.

A shaft 28 extends from mounting 26 and connects with suitable drive means, such as an electric motor connected with shaft 28 through suitable speed changer. The tape 19 is normally looped whereby the portions 31 extend in the same general direction from each side of the idler. A fin or rib 30 is disposed between the tape portions for magnetic shielding. A portion 30*a* of this rib extends beyond the capstan 22 (Figures 1 and 4) to facilitate tape threading. Adjacent the end of rib extension 30*a* there is a grooved guide stud 30*b*. The two tape portions are frictionally pressed against the opposite sides of the capstan 22 by the presser or pinch rollers 32. These rollers are journaled to the free ends of arms 33 that are secured to corresponding ends of the shafts 34. The shafts are pivotally carried by the mounting 26, and their lower or inner ends are connected by adjustable arms 36 with common operating means, such as the rotary motion solenoid 37. The linkage mechanism illustrated for connecting both the adjustable arms with the solenoid, consists of a link member 38 having its one end pivotally connected to the operating pin 39 of the rotary solenoid 37, and having its other end connected by the links 41 with the free ends of the adjustable arms 36. Adjustment of the arms 36 is desirable to facilitate assembly in manufacture. The particular construction illustrated employs an arm part 36*a* which is fixed to its corresponding shaft 34, and which by virtue of screws 42 and 43, is adjustable with respect to the other part 36*b* of the arm.

When the solenoid 37 is energized equalized forces are applied to the presser rollers 32 whereby they press the portions 31 of the magnetic tape 19 against the opposite sides of the driving capstan 22. When the solenoid is de-energized, spring means incorporated in its construction serves to return member 39 to its initial position, with the result that the rollers 32 are moved to the retracted positions shown in Figure 1.

Suitable magnetic head assemblies 45 are arranged to engage the tape portions 31 between the idler 23 and capstan 22. These assemblies may include record and playback.

Previous reference has been made to the tape tension arms 18. Each of these arms has a tape engaging roller 46 carried at its free end, and as shown in Figure 1, the tape is looped over this roller, and also engages the adjacent guide roller 47, carried by the plate section 10*b*.

Figures 2, 3:
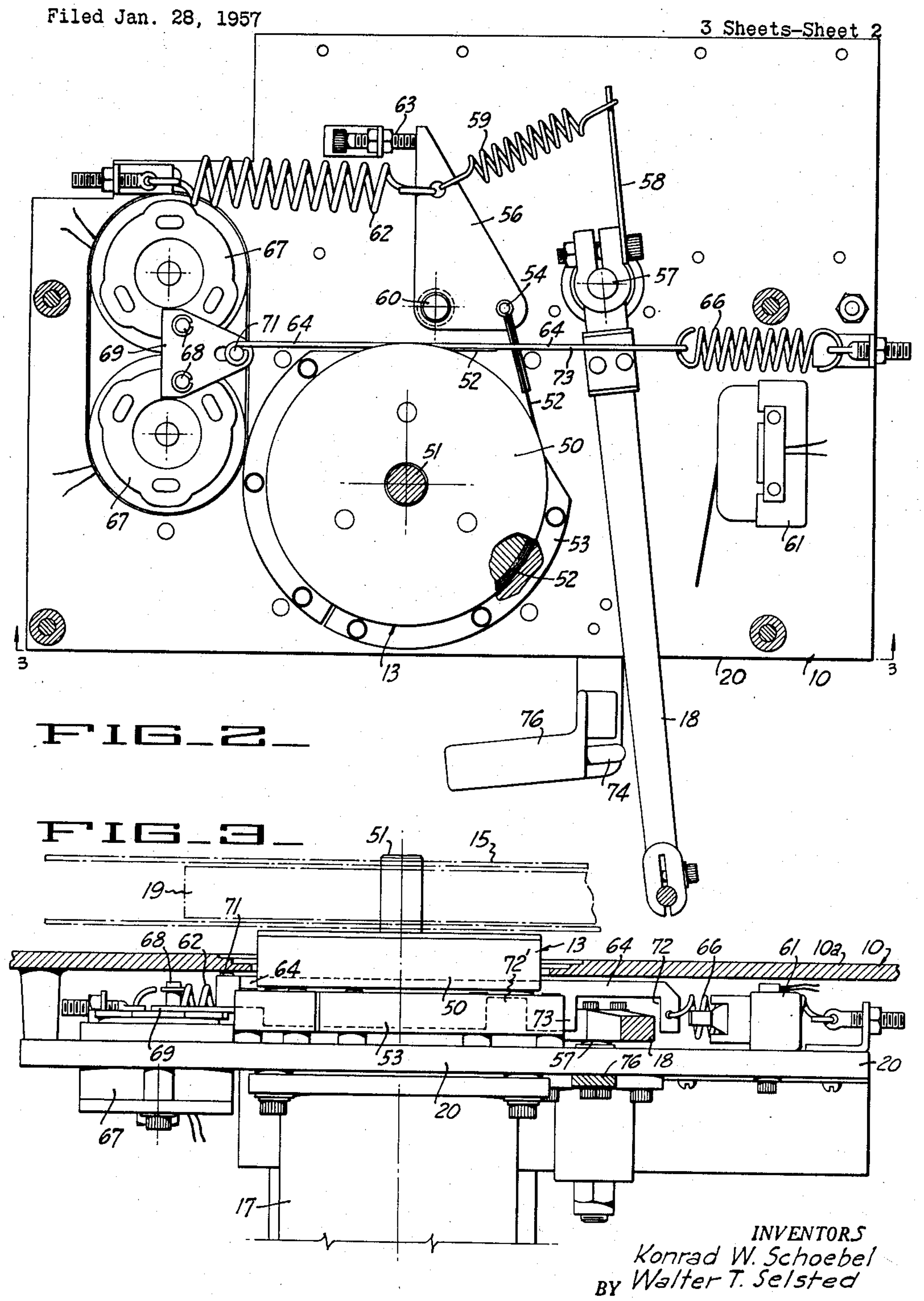
Figure 2 is a side elevational view of the upper section of the machine shown in Figure 1, the mounting plate thereof being removed to better illustrate the braking means associated with the upper turntable.
Figure 3 is a cross-sectional detail taken along the line 3—3 of Figure 2.

The braking means associated with each of the tension arms 18 can be constructed as shown in Figures 2 and 3. A flanged brake wheel or drum 50 is attached to the shaft 51 of the associated turntable, and is engaged by the brake band 52. The major part of the wheel periphery can be enclosed by the housing or shroud 53, to prevent brake band displacement. One end of the brake band is attached at 54 to the rocker arm 56. Tension arm 18 is carried by the pivotally mounted shaft 57, and is operatively connected with the rocker arm 56 by finger 58 and tension spring 59. Spring 59 tends to urge the arm 18 in a counter-clockwise direction as viewed in Figure 2, and at the same time the spring urges the rocker 56 in a clockwise direction about pivot 60. In its one limiting position arm 18 may engage the operating member of a micro-switch 61.

Rocker arm 56 is urged in a counter clockwise direction (as viewed in Figure 2) by another tension spring 62. Normally this spring is stronger than the spring 59, whereby it tends to retain the plate 56 against the adjustable stationary stops 63. The other end of the brake band is attached to the strap or bar 64. This bar extends tangentially to the periphery of the brake wheel, and is urged by tension spring 66 in a direction tending to tighten the band about the brake drum. The other end of the bar 64 is connected with solenoid means for completely releasing the brake band. This solenoid means can be in the form of a pair of solenoids 67 of the rotary type, having their operating members 68 loosely connected to a member 69, which in turn has a pin and slot connection 71 with the bar 64. When the solenoids 67 are energized bar 64 is moved sufficiently far to completely release the band with respect to the periphery of the brake drum. Bar 64 can be provided with a notch 72' to accommodate that end of the band 52 which is attached to plate 56 (Figure 3). Another notch 72 accommodates the adjacent portion of arm 18. The shoulder 73 defining one end of slot 72 is adapted to engage arm 18, when this arm moves to the left as viewed in Figure 2. Also the arm when moved in this direction engages the spring pressed pin 74 of the dash pot or damper 76. This device consists of a spring urged plunger, together with suitable damping material to provide some mechanical damping.

The braking means described above operates as follows: Assuming that it is associated with the upper reel 15, the drum rotates in a clockwise direction (as viewed in Figure 2) when the magnetic tape machine is in its rewind mode of operation. The bar 64 is restrained by a fixed stop forming a part of the linkage connecting the same to the solenoids 67. Plate 56 assumes a position determined by the tensioning of spring 62. Assuming that spring 66 is at minimum tensioning, then force applied by spring 62, acting through the rocker arm 56, determines the braking effort applied by the brake band to the drum 50. When arm 18 is moved to the left (Figure 2), it engages shoulder 73 to move member 64 and thus increases the tension of spring 66. This serves to reduce the braking effort. Movement of arm 18 to the left is accompanied by reduction in the length of the tape loop engaged about roller 46. As arm 18 approaches the limit of its movement to the left, it engages the damping means 76 which applies additional resisting force, with damping. During normal operation, the tape loop 31 remains substantially constant in length, except for changes during stop and start operations, and changes to compensate for varying diameters of the roll of tape on the reel.

Rotation of the turntable in a reverse direction, that is rotation of drum 50 counter clockwise as viewed in Figure 1, causes the plate 56 to move against the stop 63, whereby the brake effort is controlled solely by the tension of spring 66.

When the solenoids 67 are energized, bar 64 moves to the left (Figure 2) a sufficient distance to completely release the band with respect to the brake drum. Therefore under such condition the turntable is free to rotate for fast forward or rewind operations.

The brake means for the lower turntable is identical to that described above, except that it is reversed and connected for reversed braking.

For convenience the operation of the braking device and tension arm associated with the upper take-up reel has been described because details are shown in Figure 2. In practice, however, the braking action is more important as applied to the lower or supply reel, where it maintains a desired amount of tape tension during normal recording or playback.

The motors associated with each of the turntables are connected to suitable circuits to be energized in accordance with various operating conditions. Assuming that reel 15 is taking up tape for normal recording and playback, the turntable motor corresponding to this reel is energized during such normal operations, whereas the motor associated with the other supply turntable is deenergized. For fast forward movement of the tape, the motor associated with turntable 13 is energized to provide the proper torque for the desired rapid turning, and the motor associated with turntable 14 is held back. For rewind operations the motor associated with turntable 14 is energized, and the motor associated with turntable 13 is held back by reverse electrical torque. The circuitry associated with the solenoids 67 is such that they are energized to disengage both of the braking means for both fast forward and rewind operations. At the end of fast forward and rewind operations, and immediately after the motors associated with the turntables are deenergized, solenoids 67 for both braking means are deenergized, thus applying the brakes to slow down the turntables without tape slack. The turntable from which the tape is unwinding is braked with greater braking torque than the other turntable, to stop the turntables without tape slack.

As explained above, during normal recording or playback operations, the motor associated with supply turntable 14 is deenergized, whereby rotation of this turntable is under the control of the braking means. Also at this time solenoid 37 is energized whereby the rollers 32 press the tape upon opposite sides of the driving capstan 22. As the tape is being driven at a constant rate by the capstan, the arm 18 for the supply reel assumes a position intermediate its limiting positions and against shoulder 73, positioning member 64, to provide adequate braking torque to turntable 14 to maintain a tape loop of proper tension about roller 46, balanced by the tension force of spring 66 and the added compression force of the spring pressed pin 74. If for some reason the tape loop about roller 46 shortens, tending to increase the tape tension, arm 18 is moved to the left, moving member 64 to immediately reduce the braking effort, thus tending to extend the loop. Conversely when the loop tends to increase in length, braking effort is automatically increased thus tending to reduce the loop length. As a result the length of the loop and the tape tension tends to remain substantially constant, with controlled braking effort. Over a period of time the length of the loop will vary somewhat to compensate for the change taking place in the diameter of the tape roll. However, the tension applied to the tape extending from the supply reel is maintained constant, irrespective of changes in the diameter of the tape roll.

As previously mentioned when it is desired to rewind the tape, the solenoids 67 for both braking means are energized whereby both brakes are completely released. At the same time the motor connected to turntable 14 is energized for fast rewind torque. Solenoid 37 is deenergized whereby presser rollers 32 disengage the capstan, thus permitting the tape to move freely through the capstan assembly.

In connection with the foregoing, it may be explained that each braking device provides for controlled braking in addition to spring tension applied to the tension arms, although for the supply reel, braking during normal rotation (clockwise as in Figure 2) is varied between certain limits by movements of arm 18. Disregarding the tension arms, each brake provides braking torque for both directions of rotation, although for one direction (clockwise Figure 2) the torque is greater than for the other direction, due to different servo effects and differences in the strengths of springs 62 and 66.

Assuming that the tape is driven in one direction for record or playback operations, only the brake associated with the supply turntable makes use of its tension arm to control the tape tension through the braking means. In such event the tension arm for the take-up turntable can be omitted, or it may be used as a spring urged compliance arm. However, with the tension arm for the turntable 14, the tape may be driven in either direction for playback or recording, assuming use of suitable means for reversibly driving the capstan.

The capstan assembly described above maintains equalized pressure between the two portions of the tape and the opposite sides of the capstan. When constant tension is maintained on that portion of the tape being supplied to the capstan, a very small and controlled amount of slippage takes place on one side of the capstan, namely the lower side as viewed in Figure 1, and this has the effect of maintaining the tape loop between the capstan and the idler 23 at a constant tension. This tension is somewhat less than the tension upon that part of the tape extending from the reel 16 to the capstan. Maintenance of such tension, in a tight loop makes for uniform movement of the tape past the head assemblies 45, thus minimizing flutter. By way of example, the tension maintained upon that part of the tape extending from the reel to the capstan 22, may be of the order of ten to twelve ounces, whereas the tension of the loop between the capstan 22 and idler 23, can be of the order of ten ounces.

We claim:

1. In magnetic tape apparatus, an idler roller about which a magnetic tape is adapted to be looped, the portions of the loop extending in the same general direction from the idler, a driving capstan disposed between said portions of the tape, and spaced from the idler, a pair of pivotally mounted arms, rollers carried by the free ends of said arms and adapted to engage the portions of the tape to press the same against the opposite sides of the driving capstan, an operating member, means including links to operatively connect said operating member with said arms, whereby when said operating member is moved in one direction, said arms are turned to urge the rollers against the capstan, and solenoid means connected to said member to cause movement of the same in said one direction, said operating member being free floating whereby equal pressures are applied by said rollers to said capstan.

2. Apparatus as in claim 1 together with adjustable connections between said arms and said links.

3. In magnetic tape apparatus, support means, a magnetic tape reel, means for rotatably mounting said reel on said support means, an idler roller on said support means with the magnetic tape extending from said reel looped thereabout, a driving capstan disposed on said support means in spaced relation to said idler roller and intermediate the legs of the loop in the tape, a pair of arms pivotally mounted on said support means, a roller carried by the free end of each arm, said arms being movable between an extended position wherein the rollers press the tape against said driving capstan and a retracted position wherein the rollers are spaced from said capstan, an operating member, means connected to said operating member for reciprocating said operating member between a first position and a second position, and means connected to said arms and to said operating member for moving said arms to said extended position when said operating member is reciprocated to said first position and to said retracted position when said operating member is reciprocated to said second position.

4. In magnetic tape apparatus, a support means, a tape reel, means on said support means for rotatably mounting said reel, capstan means disposed on said support means in spaced relation to said reel for driving the tape in said apparatus when said apparatus is in its record or playback modes of operation, the tape extending between said capstan means and said reel, means on said support means for applying a variable amount of braking to said reel, biasing means connected to said braking means for urging the same toward a predetermined maximum amount of braking, an arm pivotally mounted at one end to said support means, said arm engaging said biasing means and reducing the amount of braking when said arm is moved in one direction beyond a predetermined distance, and additional biasing means connected to said arm for urging said arm in the opposite direction, the free end of said arm engaging the portion of the tape between said reel and said capstan means, the position of the free end of said arm being controlled by the opposed forces of said biasing means and the tension of the tape against the free end of said arm.

5. In magnetic tape apparatus, a support means, a tape supply reel, means on said support means for rotatably mounting said reel, capstan means disposed on said support means in spaced relation to said reel for pulling tape from said reel when said apparatus is in its record or playback modes of operation, and thereby rotating the same in one direction, means connected to said reel for rotating the reel in the opposite direction when said apparatus is in its rewind mode of operation, means on said support means for applying a variable amount of braking to said reel, means connected to said braking means for limiting the maximum amount of braking applied to said reel when said reel is rotating in said one direction, biasing means connected to said braking means for urging the same toward the maximum amount of braking, means connected to said biasing means for limiting the maximum amount of braking applied to said reel when said reel is rotating in said opposite direction, an arm pivotally mounted at one end to said support means, said arm engaging said biasing means and reducing the amount of braking when said arm is moved in one direction beyond a predetermined distance, and additional biasing means connected to said arm for urging said arm in the opposite direction, the free end of said arm engaging the portion of the tape between siad reel and said capstan means, the position of the free end of said arm being controlled by the opposed forces of said biasing means and the tension of the tape against the free end of said arm.

6. In magnetic tape apparatus, a support means, a tape supply reel, means on said support means for rotatably mounting said reel, a brake drum connected to said mounting means, capstan means disposed on said support means in spaced relation to said reel for pulling tape from said reel when said apparatus is in its record or playback modes of operation, and thereby rotating the same in one direction, means connected to said reel for rotating the reel in the opposite direction when said apparatus is in its rewind mode of operation, a brake band disposed in braking relationship with said drum, biasing means connected to one end of said brake band for urging the same toward the maximum amount of braking, means connected to the other end of said brake band for limiting the maximum amount of braking applied to said reel when said reel is rotating in said one direction, means connected to said biasing means for limiting the maximum amount of braking applied to said reel when said reel is rotating in said opposite direction, an arm pivotally mounted at one end to said support means, said arm engaging said biasing means and reducing the amount of braking when said arm is moved in one direction beyond a predetermined distance, and additional biasing means connected to said arm for urging said arm in the opposite direction, the free end of said arm engaging the portion of the tape between said reel and said capstan means, the position of the free end of said arm being controlled by the opposed forces of said biasing means and the tension of the tape against the free end of said arm.

References Cited in the file of this patent

UNITED STATES PATENTS

| | | |
|---|---|---|
| 680,706 | Edmunds | Aug. 20, 1901 |
| 2,127,772 | Horn et al. | Aug. 23, 1938 |

FOREIGN PATENTS

| | | |
|---|---|---|
| 363,381 | Great Britain | Dec. 14, 1931 |